United States Patent [19]

Brown

[11] 3,922,474
[45] Nov. 25, 1975

[54] COLD-PRESSED REFRACTORY MATERIALS

[75] Inventor: Clifford Gordon Brown, Fetcham, England

[73] Assignee: United States Borax & Chemical Corporation, Los Angeles, Calif.

[22] Filed: Nov. 29, 1973

[21] Appl. No.: 420,329

Related U.S. Application Data

[63] Continuation-in-part of Ser. No. 263,967, June 19, 1972, abandoned.

[30] Foreign Application Priority Data

July 1, 1971   United Kingdom............... 30844/71

[52] U.S. Cl. ................ 428/457; 427/248; 427/250; 428/539
[51] Int. Cl.² .......................................... C23C 13/02
[58] Field of Search .......... 117/107, 107.1, 107.2 R, 117/107.2 P, 106 R, 106 C, 106 A, 217, 169, 71 M, DIG. 9, 160 R; 29/182.1, 182.5, 182.7, 191.2; 427/250, 248; 428/457, 539

[56] References Cited
UNITED STATES PATENTS

| | | | |
|---|---|---|---|
| 3,065,108 | 11/1962 | Seelig et al. | 117/107 |
| 3,356,618 | 12/1967 | Didcot et al. | 117/106 A X |
| 3,366,464 | 1/1968 | Guichet et al. | 117/106 R X |
| 3,544,348 | 12/1970 | Boone et al. | 117/71 X |
| 3,622,402 | 11/1971 | Baranow et al. | 117/107.2 P X |
| 3,708,325 | 1/1973 | Kurtz et al. | 117/107.2 R X |
| 3,718,441 | 2/1973 | Landingham | 117/107 X |

*Primary Examiner*—Harris A. Pitlick
*Attorney, Agent, or Firm*—James R. Thornton

[57] ABSTRACT

Cold-pressed refractory bodies are impregnated with vapors of silicon or transition metals to give improved strength and impact resistance without sintering.

4 Claims, No Drawings

COLD-PRESSED REFRACTORY MATERIALS

This is a continuation-in-part of my copending application, Ser. No. 263,967 filed June 19, 1972 and now abandoned. The invention relates to the production of hard shaped bodies made from boron-containing compounds, in particular from refractory metal borides and from boron-carbon compounds, such as boron carbide.

The usual method of processing refractory materials to form hard shaped bodies is that of hot-pressing, which is a comparatively expensive process. An alternative process of cold-pressing followed by sintering may also be employed for certain powdered refractory materials.

It is an object of this invention to provide shaped bodies of boron-containing refractory materials of high strength and impact resistance by a method which does not require hot-pressing or sintering. Such bodies may be used in place of hot-pressed articles, such as tool tips, shot-blast nozzles, ceramic armour, or in wear-resistant applications such as bearing surfaces.

It has now been found that porous, non-sintered bodies of boron-carbon compounds and bodies of boron-metal compounds can be impregnated with silicon or with a transition metal by vacuum deposition of a vapor of the chosen element. The porous bodies are cold-pressed bodies of boron carbide or boron-metal compounds of metals of Groups IIA, IIIA, IVA, VA, or VIA of the Periodic Table, especially the metal borides. The impregnation process results in bodies of high strength and impact resistance without need for sintering after impregnation.

The preferred impregnants used for the vacuum impregnation are silicon, iron, cobalt, nickel, manganese and chromium. The impregnation is effected by heating the silicon or metal, such as in a pack, under reduced pressure, such as 4–10 mm. Hg, preferably about 6–8 mm. Hg, to a temperature below the melting point at atmospheric pressure of the silicon or metal, which is sufficient to volatalize the element. The porous boron-containing body is held in the vapors of the element thereby impregnating the body throughout with the element and thereby strengthening and hardening the body. Thus, there is a gaseous migration of the impregnating material throughout the interconnecting pores of the porous body followed by reaction and/or condensation, depending on the impregnating material used.

The temperatures normally employed in the practice of this invention for the several infiltrating or impregnating agents are as follows:

| | | |
|---|---|---|
| Manganese | 1100° – 1250°C. | (preferably about 1200°C.) |
| Silicon | 1300° – 1400°C. | (preferably about 1340°C.) |
| Chromium | 1550° – 1700°C. | (preferably about 1600°C.) |
| Iron | 1400° – 1500°C. | (preferably about 1490°C.) |
| Cobalt | 1390° – 1490°C. | (preferably about 1480°C.) |
| Nickel | 1350° – 1450°C. | (preferably about 1440°C.) |

In the practice of this invention, the boron-containing body, e.g. in the form of a pellet about ⅜ inch in length and about ½ inch in diameter, is placed in a crucible made of graphite or other suitable material mounted on a tungsten support, together with sufficient infiltrating or impregnating agent to fill the crucible loosely. A diluent, such as silicon carbide, may be added to the contents of the crucible, if desired. The whole is surrounded by a silica envelope with suitable arrangements for the required ranges of temperature and pressure to be maintained. The shaped body and infiltrating agent can be heated by means of a 5 kilowatt R.F. coil for about 30 – 80 minutes (preferably 50 – 70 minutes) at the appropriate temperature. During the process an inert atmosphere, such as argon, is maintained.

Suitable conditions for this invention are shown in Examples 1 – 10 of Table 1, which describes amounts of refractory boride and of infiltrating agent, times of heating, and temperatures and pressures used.

TABLE I

| Example No. | Refractory (g.) | Infiltrant (g.) | Temperature (°C.) | Time (min.) | Pressure (mm. Hg.) |
|---|---|---|---|---|---|
| 1 | $TiB_2$(3.0g) | Si (5.0g) | 1340–1350 | 60 | 6 – 7.5 |
| 2 | $BaB_6$(3.0g) | Si (5.0g) | 1330–1370 | 60 | 7.0 |
| 3 | $LaB_6$(4.0g) | Mn (20g) | 1180–1190 | 60 | 4.5–10 |
| 4 | WB (8.0g) | Mn (20g) | 1155–1180 | 60 | 5 – 8 |
| 5 | $ZrB_2$(4.0g) | Cr (20g) | 1580–1600 | 60 | 6.5–8 |
| 6 | $TiB_2$(3.0g) | Cr (20g) | 1580–1600 | 60 | 6.0–7.0 |
| 7 | $B_4C$ (2.0g) | Mn (20g) | 1140–1230 | 60 | 6.0–9.0 |
| 8 | $TiB_2$(3.0g) | Fe (20g) | 1460–1490 | 60 | 6.5–7.5 |
| 9 | WB (8.0g) | Co (20g) | 1430–1480 | 60 | 6.0–8.0 |
| 10 | $ZrB_2$(4.0g) | Ni (20g) | 1420–1445 | 60 | 7.0–8.5 |

All the above reactions were carried out in an atmosphere of argon.

All products were found to have low residual porosity, high hardness, and a metallic lustre when polished. The infiltration produced little or no change in the dimensions of the refractory body, but substantially improved the properties thereof. Such products are distinctly different from shaped bodies which have been coated in a pack, such as by diffusion coating which results in only slight diffusion into the surface of the article coated.

Results in terms of increase in density are shown in Table II for some typical combinations of boron-containing body impregnant.

TABLE II

| Starting Material | Infiltrant | Density of Starting Material (gm. cm.$^{-3}$)* | Density of Product (gm. cm.$^{-3}$) |
|---|---|---|---|
| $B_4C$ | Mn | 1.75 | 5.37 |
| $TiB_2$ | Si | 3.15 | 3.45 |
| $TiB_2$ | Mn | 3.15 | 4.11 |
| $TiB_2$ | Cr | 3.15 | 3.64 |
| $MoB_2$ | Mn | 5.00 | 5.40 |
| $ZrB_2$ | Si | 4.25 | 4.35 |
| $ZrB_2$ | Mn | 4.25 | 5.06 |
| $ZrB_2$ | Cr | 4.25 | 6.01 |
| $LaB_6$ | Si | 1.83 | 3.86 |
| $BaB_6$ | Si | 3.12 | 3.44 |

*assuming 30% porosity

The impregnated shaped bodies can be machined, e.g. with a diamond saw, to shape appropriate to a desired end use.

Various changes and modifications of the invention can be made and, to the extent that such variations incorporate the spirit of this invention, they are intended to be included within the scope of the appended claims.

What is claimed is:

1. A cold-pressed, non-sintered boron-containing refractory body which is impregnated throughout with a material selected from the group consisting of manganese, silicon, chromium, iron, cobalt, and nickel, said impregnated body having a low residual porosity and increased density and hardness, wherein said boron-containing refractory is selected from the group consisting of boron-metal compounds of metals of Groups IIA, IIIA, IVA, VA, and VIA of the Periodic Table.

2. An impregnated cold-pressed body according to claim 1 in which said boron-containing refractory is zirconium diboride.

3. An impregnated cold-pressed body according to claim 1 in which said boron-containing refractory is titanium diboride.

4. A cold-pressed, non-sintered boron carbide body impregnated throughout with silicon, thereby having a low residual porosity and increased density and hardness.

* * * * *